Patented June 3, 1941

2,244,284

UNITED STATES PATENT OFFICE 2,244,284

DIELECTRIC AGENTS AND METHOD OF MAKING SAME

Edgar C. Britton and Gerald H. Coleman, Midland, Mich., assignors to The Dow Chemical Company, Midland, Mich., a corporation of Michigan No Drawing. Application February 3, 1937, Serial No. 123,899

13 Claims. (Cl. 260—649)

This invention concerns a method for making certain halogen-containing organic condensation products which are useful as dielectric agents. It also includes new products made by such method which are useful not only for the purpose just stated, but also as high boiling solvents and plasticizers in varnishes and plastic compositions, as intermediates for the preparation of other organic products, and for other purposes.

The method which we employ in making the herein described dielectric materials consists essentially in reacting a saturated dihalo-aliphatic hydrocarbon, having the halogen atoms attached to different carbon atoms, with a nuclear halogenated benzene hydrocarbon, containing at least one labile hydrogen atom. Examples of suitable nuclear halogenated benzene hydrocarbons, which preferably contain not more than 4 halogen atoms, are chlorobenzene, dichlorobenzene, tribromobenzene, chlorotoluene, chloroethylbenzene, chloro-xylene, 2,4-diethyl-chlorobenzene, etc. Among the various dihalo-aliphatic hydrocarbons which may be employed in the reaction are: ethylene chloride, ethylene iodide, propylene bromide, 1,3-dichloro-propane, 1,2-dibromo-butane, etc.

The reaction is carried out at room temperature or above, usually at temperatures between 30° and 125° C., in the presence of a condensing agent such as the Friedel-Crafts catalysts aluminum chloride, aluminum bromide, ferric chloride, etc. Other condensing agents, such as the complex compound formed by permitting a mixture of aluminum chloride, benzene, an alkyl halide, and hydrogen halide to stand, may also be employed to catalyze the reaction. It is preferable to add the dihalo-aliphatic hydrocarbon gradually and with stirring to a mixture of the halogenated benzene hydrocarbon and the catalyst heated to the reaction temperature, but other procedure may be used if desired.

Liquid and resinous products are usually obtained from the reaction in proportions which vary according to the proportions of the principal reactants used. When a large excess of the halogenated benzene hydrocarbon is used, the major product is an oily liquid, along with a minor proportion of a resinous material of higher molecular weight. As the molecular ratio of the halogenated benzene hydrocarbon to the dihalo-aliphatic hydrocarbon is reduced, the yield of resinous product is increased at the expense of the oily product. In general, when more than 5 moles of the halogenated benzene hydrocarbon is used per mol of dihalo-aliphatic hydrocarbon, the oily material is the major product, whereas with less than 5 mols of the halogenated benzene hydrocarbon per mol of the dihalo-aliphatic hydrocarbon the resinous material may be obtained as the major product. By using more than one mol of the dihalo-aliphatic hydrocarbon per mol of the halogenated benzene hydrocarbon reactant the resinous material may be obtained as substantially the only organic product from the reaction.

According to the invention, a halogenated benzene hydrocarbon is treated with from 0.1 to 0.5 its molecular equivalent of aluminum chloride, or other Friedel-Crafts catalyst, and the mixture is heated under reflux to a temperature above 30° C., usually between 50° and 125° C. The dihalo-aliphatic hydrocarbon is then added to the hot mixture gradually and with stirring, after which stirring and heating are continued until hydrogen halide evolution ceases. The mixture is then cooled, treated in the usual way to remove the catalyst, and distilled, the liquid product being collected in the distillate and the resinous product remaining as the still residue.

The new liquid products prepared according to the above method consist largely of a compound, or mixture of isomeric compounds, formed in accordance with the equation:

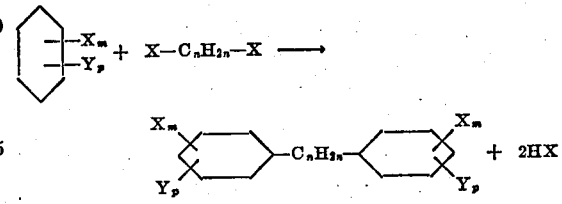

wherein X is halogen, Y is halogen or an alkyl radical, and $n$, $m$, and $p$ are integers, $n$ being greater than 1. When the compounds are derived from ethylene chloride, they have the formula,

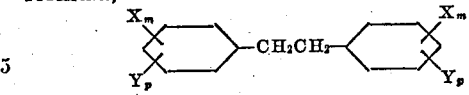

and, accordingly, are ring halogenated derivatives of dibenzyl. The resinous products also obtained are of unknown identity.

The following examples illustrate a number of ways in which the invention has been practiced but are not to be construed as limiting the invention.

*Example 1*

A solution of 138 grams (1.39 mols) of ethylene chloride in 338 grams (3 mols) of chlorobenzene was added gradually and with stirring to a mixture of 37.4 grams (0.28 mol) of aluminum chloride and 2475 grams (22 mols) of chlorobenzene heated to about 80° C. After completing the addition, the mixture was heated under reflux at 80° C. with stirring for 2 hours. It was then cooled, washed with dilute aqueous hydrochloric acid to remove aluminum chloride therefrom, and fractionally distilled. There were obtained 311 grams (1.23 mols) of dichloro-dibenzyl, boiling at temperatures between 170° C. at 6 millimeters pressure and 180° C., at 12 millimeters pressure, and 22.5 grams of higher boiling residual resinous material. The dichloro-dibenzyl is an oil at room temperature and has the formula,

*Example 2*

A mixture of 294 grams (2 mols) of ortho-dichloro-benzene, 198 grams (2 mols) of ethylene chloride, and 67 grams (0.5 mol) of aluminum chloride was heated under reflux with stirring for 3 hours at temperatures which were gradually raised from 60° to 120° C. The mixture was then cooled and diluted by addition of 200 cubic centimeters of ethylene chloride, after which it was washed to remove the aluminum chloride therefrom, and fractionally distilled. The following fractions of distillate were collected: (1) 8 grams of an oil distilling at temperatures between 192° and 206° C. at atmospheric pressure; (2) 10 grams of crude tetrachloro-diphenyl ethane, distilling largely at temperatures between 200°-205° C. at 5.5 millimeters pressure, which product, after recrystallization from ethylene chloride, melted at 137.5-143° C.; and (3) 20 grams of oily material distilling at temperatures between 205° and 220° C. at 4-5.5 millimeters pressure and containing about 42 per cent of chlorine. As residue from the distillation there was obtained 218 grams of black resinous material which was hard and brittle at room temperature but softened at 143° C., had a molecular weight of about 1420 and a density of 1.296 at 20° C., and contained approximately 36 per cent of chlorine. The tetrachloro-diphenyl ethane product, which may also be termed tetrachloro-dibenzyl, has the formula,

*Example 3*

113 grams (1 mol) of propylene chloride was added in one hour to a mixture of 1125 grams (10 mols) of chlorobenzene and 13.5 grams of aluminum chloride while stirring the mixture and maintaining the same at a temperature of approximately 45° C., stirring being continued thereafter for an additional 40 minutes during which the mixture was warmed to 62° C. The mixture was then washed successively with aqueous hydrochloric acid and water to remove the aluminum chloride, and fractionally distilled. The distillate consisted of 189 grams of a colorless thick oil, boiling principally at temperatures between 161° and 164° C. at 4 millimeters pressure, having a specific gravity of 1.177 at 20° C., and containing approximately 27 per cent of chlorine. This oily product is believed to be substantially pure dichloro-diphenyl-propane having the formula,

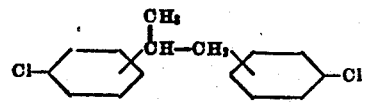

As residue from the distillation, there was obtained 14 grams of brown resinous material which contained about 25 per cent of chlorine, was a soft solid plastic at room temperature becoming softer as the temperature was raised, and was quite readily soluble in benzene and sparingly soluble in acetone.

*Example 4*

A mixture of 113 grams (1 mol) of propylene chloride, 562 grams (5 mols) of chlorobenzene, and 67 grams (0.5 mol) of aluminum chloride was heated with stirring from 40° C. to 134° C. in about 2 hours. The products were then separated as in Example 3. There were obtained 97 grams of an oily product, distilling at temperatures below 185° C. at 5 millimeters pressure, and 73 grams of residual dark brown resinous material which was hard and brittle at room temperature, softened at 91° C., contained approximately 12 per cent of chlorine, and was soluble in benzene. The oily product was redistilled, whereby 18 grams (0.07 mol) of dichloro-diphenyl-propane was separated.

*Example 5*

113 grams (1 mol) of propylene chloride was heated at temperatures between 60° and 90° C. with 1470 grams (10 mols) of ortho-dichloro-benzene and 13.5 grams of aluminum chloride for about 2 hours and the products were separated and purified as in Example 3. As the main product there was obtained 247 grams of tetrachloro-diphenyl-propane boiling principally at 195°-199° C. at 3.5 millimeters pressure, containing approximately 42.5 per cent of chlorine, and having probably the formula,

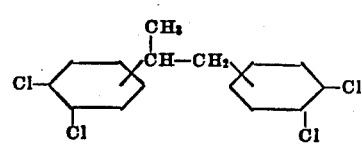

As a minor product there was obtained 33 grams of a higher boiling resinous material (boiling above 285° C. at 4 millimeters pressure) which was hard and brittle at room temperature, contained about 38.5 per cent of chlorine, and dissolved quite readily in benzene.

*Example 6*

113 grams (1 mol) of propylene chloride was added in one hour to a mixture of 735 grams (5 mols) of ortho-dichloro-benzene and 67 grams (0.5 mol) of aluminum chloride while stirring and maintaining the mixture at temperatures between 40° and 50° C. The mixture was then heated, with continued stirring, to 170° C. in 1.5 hours, after which it was cooled, washed to remove the aluminum chloride, and distilled. There were obtained: 70 grams of an oily product distilling at temperatures up to 195° C. at 4 millimeters pressure and containing about 39 per cent of chlorine; 43 grams of material, distilling at temperatures between 195° and 202° C. at 4 millimeters pressure, which partially crystallized on standing; and 87 grams of residual black resinous material which was hard and brittle at room temperature, softened at 114° C., had the specific gravity 1.314 at 20° C., and contained approximately 25 per cent of chlorine.

Example 7

A mixture of 113 grams (1 mol) of propylene chloride, 1470 grams (10 mols) of para-dichlorobenzene, and 13.5 grams of aluminum chloride was reacted at temperatures between 65° and 95° C. and the products were separated as in Example 3. There was obtained 216 grams (0.65 mol) of a tetrachloro-diphenyl-propane boiling for the most part at temperatures between 192° and 195° C. at 5 millimeters pressure, and as a minor product 24 grams of higher boiling material (boiling at temperatures above 292° C. at 4 millimeters pressure), which contained about 38.5 per cent of chlorine and was a hard brown non-crystalline resin at room temperature, softening at higher temperatures. Both products were soluble in benzene. The tetrachloro-diphenyl-propane was a viscous oil at room temperature, contained approximately 42 per cent of chlorine and had the formula,

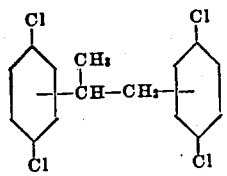

Example 8

A mixture of 127 grams (1 mol) of 1,2-dichloro-normal-butane, 1125 grams (10 mols) of chlorobenzene, and 13.5 grams of aluminum chloride was reacted and the products were separated as in Example 3. There were obtained, as a major product, 177 grams (0.63 mol) of dichloro-diphenyl-butane boiling principally at temperatures between 167° and 174° C. at 4.5 millimeters pressure, and as minor product 26 grams of resinous material, boiling at temperatures above 265° C. at 4.5 millimeters pressure, which contained approximately 23 per cent of chlorine, was hard and brittle at room temperature and was soluble in benzene. The dichloro-diphenyl-butane was a viscous oil and had the formula,

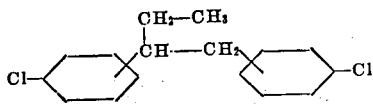

Example 9

A mixture of 127 grams (1 mol) of 1,2-dichloro-isobutane, 1125 grams (10 mols) of chlorobenene, and 13.5 grams of aluminum chloride was reacted at temperatures between 45° and 70° C. and the products were separated as in Example 3. There were obtained as principal product 208 grams of dichloro-diphenyl-butane in the form of a viscous oil boiling principally at temperatures between 175° and 180° C. at 4.5 millimeters pressure, and as minor product 14 grams of higher boiling material containing approximately 18.5 per cent of chlorine. The latter product was a dark brown brittle and fairly hard resin at room temperature and was soluble in benzene and acetone. The dichloro-diphenyl-butane product had the formula,

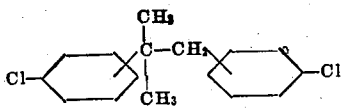

Example 10

A mixture of 127 grams (1 mol) of 1,3-dichloro-isobutane, 1125 grams (10 mols) of chlorobenzene, and 13.5 grams of aluminum chloride was reacted at temperatures between 55° and 90° C. and the products were separated, as in Example 3. There were obtained 198 grams of a colorless viscous oily material, boiling principally at temperatures between 169° and 178° C. at 4.5 millimeters pressure and containing approximately 25.5 per cent of chlorine as the main product, and 22 grams of brown brittle resinous material boiling at temperatures above 283° C. at 5 millimeters pressure and containing approximately 22 per cent of chlorine. The oily main product is di-(chlorophenyl)-butane having the probable formula,

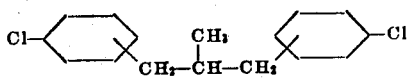

Example 11

254 grams (2 mols) of 1,2-dichloro-normal-butane was added in 15 minutes to a mixture of 147 grams (1 mol) of ortho-dichlorobenzene and 67 grams (0.5 mol) of aluminum chloride while stirring the mixture at temperatures which increased from 15° to 35° C. due to heat liberated by the reaction. The mixture was then heated, with continued stirring, to about 135° C. in 3 hours, by the end of which time the reaction was substantially complete as evidenced by the fact that the evolution of hydrogen chloride had subsided. The mixture was then cooled and the products were separated as in Example 3. There were obtained 65 grams of an oily product, which distilled at temperatures up to 200° C. at 7 millimeters pressure and contained approximately 30 per cent of chlorine, and 131 grams of a higher boiling brown resinous material which contained approximately 20 per cent of chlorine, was brittle at room temperature, and was soluble in benzene.

Example 12

A mixture of 216 grams (1 mol) of 1,2,4,5-tetrachlorobenzene, 339 grams (3 mols) of propylene chloride, and 67 grams (0.5 mol) of aluminum chloride was heated with stirring at temperatures which were raised to 130 C. in 45 minutes. It was maintained at 130° C. with continued stirring for an additional 2 hours 15 minutes, after which it was cooled and washed with aqueous hydrochloric acid to remove the aluminum chloride. The mixture was then dissolved in 500 cubic centimeters of propylene chloride, filtered, and the filtrate was evaporated to a volume of about 150 cubic centimeters, whereby 132 grams (0.6 mol) of tetrachlorobenzene crystallized and was separated. The mother liquor, containing the reaction product, was heated under vacuum at about 100° C. to remove propylene chloride therefrom. The residual product consisted of 130 grams of a black resinous material which was fairly hard at room temperature. It contained approximately 22 per cent of chlorine, had the density 1.178 at 20° C., and softened at approximately 88° C.

Example 13

A mixture of 785 grams (5 mols) of bromobenzene, 202 grams (1 mol) of propylene bromide, and 27 grams (0.1 mol) of aluminum bromide was reacted at temperatures which were gradually raised from 22° to 50° C. in 3 hours 45 minutes, the propylene bromide being added gradually during the first 2 hours of said period. The products were then separated as in Example 3. There were obtained 174 grams of a liquid product boiling at temperatures between 150° and 310° C. at 4 millimeters pressure and 37 grams of residue from the distillation in the form of a hard brittle brown resin containing 31 per cent of bromine. Both products were soluble in each of the solvents benzene and acetone. The liquid product was fractionally distilled whereby 76 grams of di-(bromo-phenyl)-propane, a liquid boiling at temperatures between 180° and 191° C. at 3.5 millimeters pressure, having a specific gravity of approximately 1.5 at 20° C., and containing approximately 45 per cent of bromine, was separated. The di-(bromophenyl)-propane product has probably the formula,

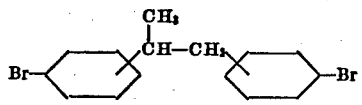

*Example 14*

A mixture of 236 grams (1 mol) of para-dibromobenzene, 94 grams (0.5 mol) of ethylene bromide and 13.5 grams (0.05 mol) of aluminum bromide was heated with stirring at temperatures between 40° and 65° C. for 1 hour 45 minutes. The reacted mixture was washed successively with aqueous hydrochloric acid and water to remove the aluminum bromide and then steam-distilled to remove unreacted ethylene bromide and dibromobenzene therefrom. As residue from the steam-distillation there was obtained 78 grams of a black soft plastic material which was readily soluble in benzene and contained 58.7 per cent of bromine.

*Example 15*

113 grams (1 mol) of propylene chloride was added in 45 minutes with stirring to a mixture of 140.5 grams (1 mol) of ethyl-chlorobenzene (largely para-ethyl-chloro-benzene) and 13.5 grams (0.1 mol) of aluminum chloride, after which the mixture was heated with continued stirring to 60° C. in 45 minutes. The catalyst was then removed as in Example 14 and unreacted materials were steam-distilled from the product. As residue from the steam-distillation there was obtained 110 grams of a dark amber colored viscous liquid containing approximately 21.5 per cent of chlorine.

*Example 16*

198 grams (2 mols) of ethylene chloride was added in 1 hour 10 minutes with stirring to a mixture of 168.5 grams (1 mol) of diethyl-chlorobenzene (boiling at 70°–74° C. at 3 millimeters pressure) and 91 grams (0.67 mol) of aluminum chloride, after which the mixture was maintained at temperatures between 70° and 80° C. with continued stirring for an additional 35 minute period. The product was then separated as in Example 14. There was obtained 198 grams of a light-brown brittle resin which was soluble in benzene.

*Example 17*

A mixture of 181.5 grams (1 mol) of trichlorobenzene, 396 grams (4 mols) of ethylene chloride, and 100 grams (0.75 mol) of aluminum chloride was heated with stirring at temperatures between 55° and 60° C. for three hours. The catalyst was then removed as in Example 14 and the residual mixture was distilled under vacuum The fraction distilling at temperatures between 210° and 250° C. at 3.5 millimeters pressure was a viscous nearly solid amber resin containing between 54 and 55 per cent by weight of chlorine. It was readily soluble in benzene and is believed to consist largely of hexachloro-diphenylethane.

Other halogen-containing condensation products having good dielectric properties may be prepared by procedure similar to that hereinbefore described and illustrated in the foregoing examples. For instance, such products may be obtained by reacting diethyl-chlorobenzene with ethylene chloro-bromide; butyl-bromo-benzene with normal butylene bromide; chlorobenzene with amylene chloride; 2,4-dichloroethylbenzene with amylene bromide; etc. Insofar as we are aware, any nuclear halogenated benzene hydrocarbon containing chlorine or bromine as the halogen substituents, and having at least one labile hydrogen atom in the benzene ring, may be reacted with any saturated dihalo-aliphatic hydrocarbon having the halogen atoms attached to different carbon atoms to obtain condensation products having the useful characteristic hereinbefore specified.

All of the compounds and products herein-described are substantially non-flammable and possess good dielectric properties, adapting them for use as dielectric agents either alone or in admixture with other dielectrics, or for impregnating materials used for electrical insulation purposes.

Other modes of applying the principle of the invention may be employed instead of those explained, change being made as regards the method or products herein disclosed, provided the steps or compounds specified by any of the following claims or the equivalent of such stated steps or compounds be employed.

We therefore particularly point out and distinctly claim as our invention:

1. The method which comprises heating to a reaction temperature in the presence of a Friedel-Crafts catalyst, a mixture of a nuclear halogenated benzene hydrocarbon containing from 1 to 4 halogen atoms, and a dihalo-propane containing the halogen substituents on different carbon atoms.

2. The method which comprises heating to a reaction temperature in the presence of aluminum chloride a mixture of chlorobenzene and propylene chloride.

3. The method which comprises heating to a reaction temperature in the presence of a Friedel-Crafts catalyst, a mixture of a nuclear halogenated benzene hydrocarbon containing from 1 to 4 halogen atoms, and a dihalo-butane containing the halogen substituents on different carbon atoms.

4. The method which comprises heating to a reaction temperature in the presence of aluminum chloride, a mixture of chlorobenzene and 1,2-dichloro-normal butane.

5. A chlorine-containing organic condensation product prepared by reacting in the presence of a Friedel-Crafts catalyst, a nuclear chlorinated benzene hydrocarbon containing from 1 to 4 chlorine atoms, with a dihalo-propane containing its halogen substituents on different carbon atoms.

6. Dichloro-diphenyl-propane, a liquid boiling at temperatures between about 161° and about 164° C. at 4 millimeters pressure, having a specific gravity of approximately 1.177 at 20° C., and having the formula,

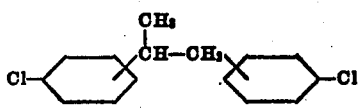

7. A chlorine-containing organic condensation product prepared by reacting in the presence of a Friedel-Crafts catalyst, a nuclear chlorinated benzene hydrocarbon containing from 1 to 4 chlorine atoms, with a dihalo-butane containing its halogen substituents on different carbon atoms.

8. Dichloro-diphenyl-butane, a liquid boiling at temperatures between about 167° and about 174° C. at 4.5 millimeters pressure, and having the formula,

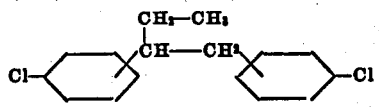

9. The method which comprises reacting a nuclear halogenated benzene hydrocarbon containing at least one labile hydrogen atom in the benzene nucleus with a saturated dihalo-aliphatic hydrocarbon having more than 2 carbon atoms in its molecule and containing the halogen substituents on different carbon atoms, the reaction being carried out in the presence of a condensing agent.

10. The method which comprises heating a nuclear halogenated benzene hydrocarbon containing from 1 to 4 halogen atoms at a reaction temperature with at least its molecular equivalent of a saturated dihalo-aliphatic hydrocarbon having more than 2 carbon atoms in its molecule and containing the halogen substituents on different carbon atoms, the reaction being carried out in the presence of a Friedel-Crafts catalyst.

11. The method which comprises reacting a mixture of one molecular equivalent of a saturated dihalo-aliphatic hydrocarbon having more than 2 carbon atoms in its molecule and containing the halogen substituents on different carbon atoms, between 5 and 10 molecular equivalents of a nuclear halogenated benzene hydrocarbon containing from 1 to 4 chlorine atoms on the benzene nucleus, and between 0.1 and 0.5 molecular equivalent of an aluminum halide catalyst.

12. A non-crystalline halogen-containing condensation product, prepared by reacting in the presence of a Friedel-Crafts catalyst a nuclear halogenated benzene hydrocarbon containing at least one labile hydrogen atom in the benzene nucleus with a saturated dihalo-aliphatic hydrocarbon having more than 2 carbon atoms in its molecule and containing the halogen groups on different carbon atoms.

13. A halogen-containing organic product prepared by reacting in the presence of a Friedel-Crafts catalyst a nuclear halogenated benzene hydrocarbon having the formula,

wherein X represents halogen, Y represents a member of the group consisting of halogen and alkyl radicals, $m$ and $p$ are integers having the sum not exceeding 5, with a saturated dihalo-aliphatic hydrocarbon having more than 2 carbon atoms in its molecule and containing the halogen substituents on different carbon atoms.

EDGAR C. BRITTON.
GERALD H. COLEMAN.